United States Patent [19]

Wright

[11] Patent Number: 4,754,351
[45] Date of Patent: Jun. 28, 1988

[54] METHOD AND APPARATUS FOR CONTROLLING RADIAL DISK DISPLACEMENT IN WINCHESTER DISK DRIVES

[75] Inventor: Harold T. Wright, San Carlos, Calif.

[73] Assignee: Maxtor Corporation, San Jose, Calif.

[21] Appl. No.: 715,650

[22] Filed: Mar. 25, 1985

Related U.S. Application Data

[63] Continuation-in-part of Ser. No. 643,043, Aug. 22, 1984, Pat. No. 4,672,488.

[51] Int. Cl.⁴ ............................................. G11B 5/012
[52] U.S. Cl. .......................................... 360/97; 360/98
[58] Field of Search ........................... 360/86, 97–99, 360/133, 135; 369/270, 282; 206/444; 346/137

[56] References Cited

U.S. PATENT DOCUMENTS

| | | | |
|---|---|---|---|
| 3,745,265 | 7/1976 | Papadopoulos et al. | 360/98 |
| 3,969,767 | 7/1976 | Griffiths et al. | 360/99 |
| 3,996,617 | 12/1976 | Cousino | 360/92 |
| 4,065,799 | 12/1977 | Kaczeus | 360/135 |
| 4,091,454 | 5/1978 | Kauffmann | 360/135 |
| 4,143,409 | 3/1979 | Iwabuchi et al. | 360/86 X |
| 4,358,843 | 11/1982 | Rager | 369/261 |
| 4,553,183 | 11/1985 | Brown et al. | 360/98 |
| 4,562,499 | 12/1985 | Mizoshita | 360/98 |

FOREIGN PATENT DOCUMENTS 2155292  5/1973  Fed. Rep. of Germany ...... 360/135

OTHER PUBLICATIONS

Beck et al., "Hub Assembly for Flexible Disk Media," IBM Tech. Disc. Bull., vol. 19, No. 12, May 1977.
Herring et al., "Adjustable Flexible Disk Pack Assembly," IBM Tech. Disc. Bull., vol. 17, No. 6, Nov. 1974.

Primary Examiner—Stuart N. Hecker
Assistant Examiner—Benjamin E. Urcia
Attorney, Agent, or Firm—Blakely, Sokoloff, Taylor & Zafman

[57] ABSTRACT

In a Winchester hard disk drive assembly having at least one disk rotatably disposed on a cylindrical spindle, the improvement compromising spacer means interposed between the inner diameter of said at least one disk and the outer diameter of said cylindrical spindle, said spacer means defining a clearance between said at least one disk and said spindle and adhesive means for adhesively securing said spacer means between said spindle, and said at least one disk, whereby a substantially uniform and contiguous clearance is maintained about the circumference of the spindle upon thermally induced differential expansion of the disk, and whereby said disk will be substantially prevented from abutting the outer circumferential wall of the spindle.

6 Claims, 2 Drawing Sheets

METHOD AND APPARATUS FOR CONTROLLING RADIAL DISK DISPLACEMENT IN WINCHESTER DISK DRIVES

This Application is a continuation-in-part of Application Ser. No. 643,043 filed on Aug. 22, 1984, U.S. Pat. No. 4,672,488.

BACKGROUND OF THE INVENTION

The advent of the Winchester disk storage devices has substantially increased the capacity and speed with which digital information can be stored and retrieved by microprocessor based systems.

As demands for increased storage capacity, reduced size, and high access speed have grown, manufacturers have made various improvements in Winchester disk drives to meet those demands. For example, to increase storage capacity, manufacturers have increased the number of disks stacked on the spindle, increased the number of usable disk surface on a disk of a given diameter, and have increased the bit density in each disk track. They have also increased the number of tracks per inch on the disk to increase storage density. As track densities increase, however, the dimensional stability of the disk-spindle assembly and acceptable tolerances for radial disk movement become critical, and high mechanical precision is required.

In prior art disk drives the disks are mounted over a spindle such that the internal diameter of each disk fits around the external diameter of the spindle with a typical locational clearance fit of 0.0035/0.0005 inches. Thus, the disks, which are intended to be stationary on the spindle, fit securely thereon but can be readily assembled and disassembled from the spindle.

Unfortunately, the dimensional relationship between the outer diameter of the spindle and the inner diameter of the disks in prior art Winchester disk drives does not remain constant. The spindle is typically ferrous so that it will carry the magnetic flux of the integral motor field magnets. The disks are typically aluminum. Temperature changes that occur within the specified operating and storage temperature range of the disk drive often causes radial movement of the disks with respect to the spindle due to differential thermal expansion of their different materials.

As a result, excessive errors are introduced during operation of the drive due to track eccentricity. Write operations must be performed with the read/write head directly on the centerline of the track. When the disks are displaced radially from their thermally stabilized position, however, a track written at the stabilizing temperature condition will be shifted off-center if it is later read under a different temperature condition. This is particularly critical with respect to the servo disk which is essential to ensuring accurate positioning of the heads.

There are two conditions under which the above-described disk eccentricity off-tracking problem most frequently arises. The first condition is where the drive is exposed to a temperature extreme outside its operating range, such as may be encountered during shipping of the drive in an airplane cargo bay. A typical operating temperature range for a Winchester disk drive, such as of the drive type known as the Maxtor XT-1000 TM is 50° C. to 4° C. In a low temperature environment such as that described above, the drive may be exposed to temperatures of $-40$ degrees c'. Subsequently, when the drive is operated at or near room temperature, excessive errors will result due to permanent radial disk offset suffered during differential thermal expansion of the disks during temperature transients.

The second frequent error condition typically occurs when low or high end operating range temperatures are approached. Winchester disk drives, which are typically assembled at room temperature and are usually dimensionally stable at that temperature. If one or more disks are abutting the spindle at room temperature, and the drive is exposed to temperatures at the low end of its desired operating range, an elastic radial movement will cause a temporary degradation in tracking performance until the drive is brought back to its original temperature condition.

The problem of disk eccentricity due to thermal gradient-induced radial disk movement becomes even more acute as track densities increase. For example, where tracks are 4 mils wide, 400 micro-inches of radial movement will not result in excessive off-tracking errors, since it represents a movement equal to only 10% of track width. However, where the tracks are 650 micro-inches wide, 400 micro-inches of movement, which is 80% of the track width, will result in excessive tracking error.

SUMMARY OF THE INVENTION

In the present invention, a suitable low modulus material is interposed between the inner circumferential edge of the disks and the outer circumferential edge of the spindle in a Winchester disk drive assembly. Narrow strips of the low modulus material are adhesively or otherwise secured longitudinally along the sidewall of the spindle. Multiple strips are secured about the spindle such that a uniform circumferential air space is maintained between the disks and the spindle. Thus, when the disks undergo differential thermal expansion, radial disk offset that would otherwise result from the disks urging against the spindle at any point along its circumference is prevented. Further, because the low modulus material will cold flow within the operating temperature range of the disk drive, no significant uneven radial forces are introduced when the disks contract to physically engage with the outer surface of the spacer strips.

It is, therefore, one object of the present invention to provide a means for creating a continuous clearance between the the spindle and the disks in a Winchester hard disk drive such that off-tracking due to radial offset of the disk is prevented. Other objects and attendant advantages of the present invention will become more apparant upon a reading of the detailed description in which like reference numerals refer to like parts throughout and in which:

DETAILED DESCRIPTION OF THE INVENTION

The present invention relates to an apparatus and method for reducing or eliminating excessive off-track error in Winchester disk drives caused by radial disk movement induced by thermal expansion or contraction of the disks.

Figure 1:
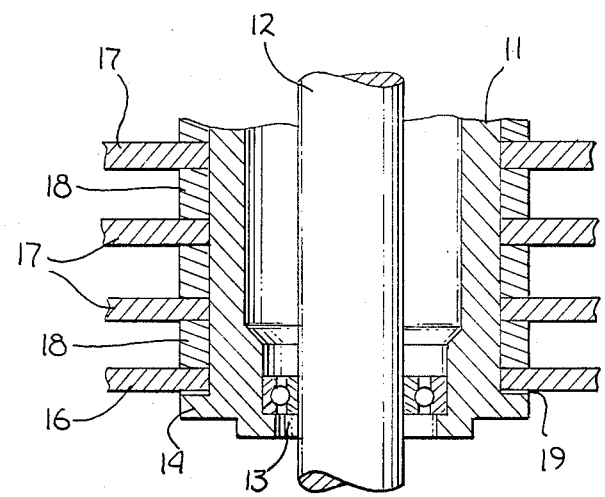
FIG. 1 is a sectional view through a portion of a spindle, hub and disk.
2.

Shown generally in FIG. 1 are basic elements of a Winchester disk drive hub-disk spindle assembly. A hub 11 of steel or other ferrous material capable of carrying the magnetic flux of integral motor field magnets is caused by means well known in the art to rotate about a shaft 12 with bearings 13 interposed. An integral peripheral flange 14 is formed on the bottom of hub 11. Normally supported by the hub 14 is a lowermost disk 16, hereinafter referred to as the servo disk, because servo information is recorded on its bottom surface. Other disks 17 are spaced above disk 16 and are separated by annular spacers 18. The substrates of disks 16, 17 and the spacers 18 are commonly of aluminum. As the hub 11 is caused to rotate, the disks 16 and 17 rotate therewith. To accomodate the different coefficients of expansion of the disks and the spindle hub 11, a slight gap (best shown in FIG. 2) occurs between the inner edge of the disks 16, 17 and the outer diameter of the hub 11.

Drives of this type are commonly operated within a temperature range of 4° to 50° C. The tracks on the disks are commonly about 0.65 mils and the pitch between the tracks is commonly 1.0 mils. The difference between the coefficient of expansion of the aluminum and steel is approximately 5 micro inches per inch per degree Fahrenheit. Thus, the disks expand at a greater rate than the hub with the increase in temperature, and as the temperature decreases may come back to a different position. In such instance, the servo information could be eccentric with respect to the recorded information on the other disks.

Figure 2:
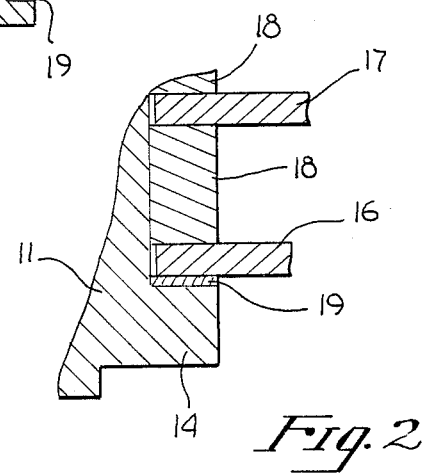
FIG. 2 is an enlarged view of a portion of FIG. 1.
3.

The solution to the problem in the form of the invention shown in FIGS. 1 and 2 is the provision of a washer 19 of Mylar about 10 mil. thick, placed on the top of flange 14 under the inner edge of the disk 16. The bottom surface of the washer 19 frictionally engages the flange 14 and the upper surface frictionally engages the disk 16. Hence, the washer 19 is placed in radial shear occasioned by the differential expansion of the two members. The washer 19 acts as a compliant member and never breaks static frictional engagement. Thus, there is no relative slippage between the disk and the flange of the hub, despite the movement therebetween.

Mylar is a preferred material because of its relatively low modulus of elasticity, and high tensile strength. Its coefficient of expansion is approximately that of an aluminum disk.

Figure 3:
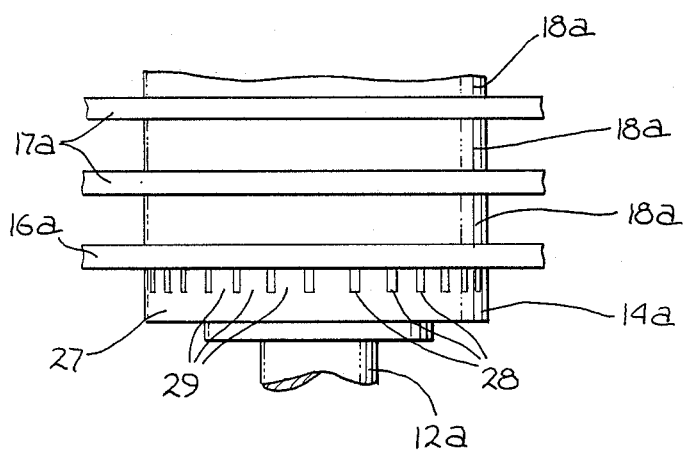
FIG. 3 is a fragmentary side elevational view of an alternative embodiment of the present invention.
4.
Figure 4:
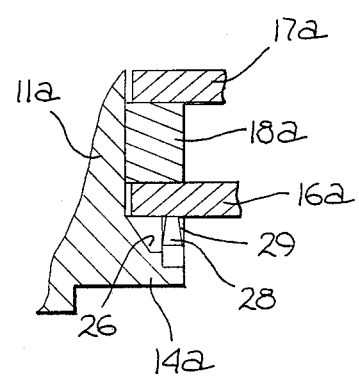
FIG. 4 is an enlarged fragmentary sectional view similar to FIG. 2 of the modification of FIG. 3.
5.

In the alternative embodiment shown in FIGS. 3 and 4, a groove 26 is cut in the top surface of the flange 14a of the hub 11a, leaving a narrow annular rim 27 at the outside of the flange 14a. Such a rim 27 is very flexible, but to improve its flexibility, a plurality of slots 28 are cut in the rim 27 extending down from the top edge thereof, forming fingers 29 between the slots 28. Such fingers are extremely flexible. The top edges of the fingers 29 engage the bottom inner edge of servo disk 16a. The slots 28 relieve hoop stress.

With changes in temperature, the fingers 29 flex inward and outward, always maintaining frictional contact with the servo disc 16a and hence return the disk 16a to its initial position.

Figure 8:
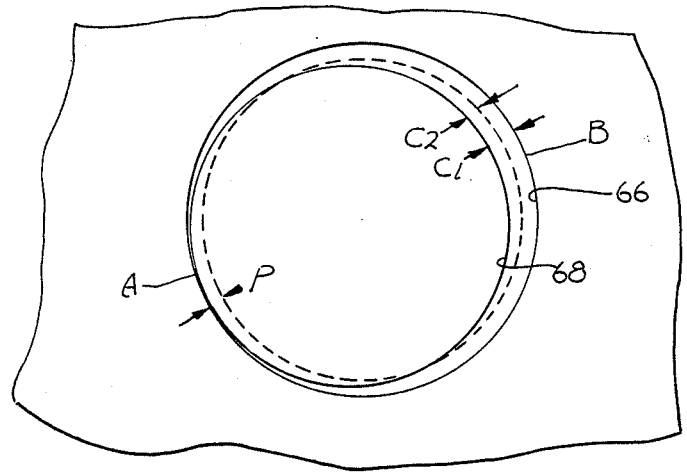
FIG. 8 illustrates schematically the problem encountered in prior art drive structures when a disk undergoes differential thermal expansion.

Referring now to FIG. 8, the problem of radial disk displacement suffered in the prior art is further illustrated. In the prior art each disk is mounted directly over the spindle. As a result, there is no means to insure there is a continuous circumferential clearance between the inner circumference of the disk 52 and the outer circumference of the spindle 44 to accomodate radial expansion and contraction of the disks. For example, during assembly at room temperature, the disks may be aligned such that one side A of the disk abuts the spindle while the opposing side B of the disk maintains a clearance C1 with the spindle.

When the disk contracts at, for example, temperatures below the assembly temperature, the disks will break static friction and clearance C1 will be reduced to C2, as forces urge side A to move inwardly toward imaginary position C3. Thus, uneven movement of the disk with respect to the spindle occurs which causes the tracks on the disks to run eccentrically resulting in off-track errors.

Figure 5:
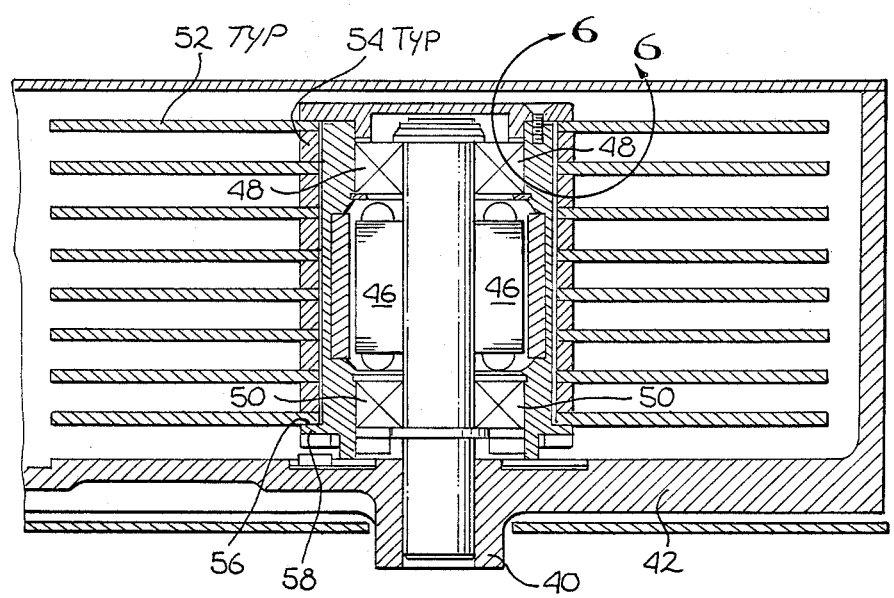
FIG. 5 is a sectional view of a Winchester disk drive in-spindle motor assembly in which the present invention is shown interposed between the disks and the spindle.

Referring to FIG. 5, a more detailed sectional view of a Winchester disk drive in-spindle motor assembly with disks mounted thereon is shown incorporating the present inventive solution to the above-described problem. However, it should be appreciated that the present invention has equal application in other hard disk drive disk spindle arrangements in addition to those shown in FIGS. 1 and 5, such as those incorporating prior art rotating shaft motors or other designs where a disk is mounted on a spindle. The drive motor assembly of FIG. 5 includes the base 42 of the drive in which a stationary motor shaft 43 is supported. The shaft in turn supports the stator 46. The spindle 44 upon which rotor magnets 47 are secured is rotatably supported about the motor shaft by bearings 48 and 50.

Figure 6:
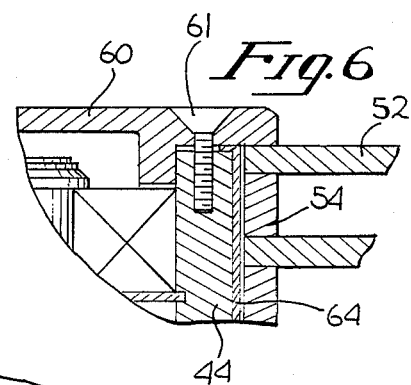
FIG. 6 is an enlarged view of a portion of FIG. 5 taken along line 2—2 showing the arrangement of the present invention in closer detail.

As shown in FIG. 5, and further shown in enlarged section FIG. 6, a plurality of circular disks 52, each having a centrally disposed aperature defined therethrough, are stacked over spindle 44. The disks are separated from each other by annular spacers 54. The inner periphery of the lower surface 56 of the bottom disk abuts the integral peripheral flange 58 of the spindle 44. Spindle cap 60 is secured in place with screws 61 and abuts the uppermost disk at its inner peripheral upper surface 62. Thus, the disk stack is retained securely in place by being effectively clamped between the integral peripheral flange 58 and the spindle cap 60.

Spacer strips 64 of material of a suitable low modulus of elasticity (less than 65,000 16/in$^2$) and coefficient of friction are adhesively secured longitudinally along the outer wall of the spindle.

In the preferred embodiment, Teflon, which has a substantially low modulus of elasticity, is somewhat elastic, and has a low coefficient of friction, has been found to be a preferred material for the present inventive spacer strips. Also, because of its low friction coefficient, the invention enables closer dimensional tolerances to be used between the spindle and the disk.

In the preferred embodiment of the present invention, four narrow strips having a nominal thickness of approximately 0.006 inches are used, disposed substantially equidistant from each other about the circumference of the spindle. However, greater or fewer spacer strips of different thicknesses may be employed as required. The spacer strips create a selected clearance between the disks and the spindle that effectively eliminates radial displacement of the disks resulting from differential expansion caused by temperature variations.

In an alternative embodiment of the present invention, temporary shims may be used to create a suitable continuous clearance between the disk and the hub. Using this method, the higher modulus shims are used instead of the Teflon spacer strips. The shims are inserted between the disks and the spindle. Multiple shims may be used as required about the circumference of the spindle.

The disks are then clamped into place by bolting down the spindle cap 30 with screws 31. The shims are then physically removed leaving a continuous and substantially uniform clearance between the disks and the spindle to accomodate thermal differential expansion of the disks.

Using the present invention, a continuous clearance is maintained between the disk and the spindle so that there are no uneven radial forces introduced during differential expansion of the drive, and therefore no radial shift occurs.

Figure 7:
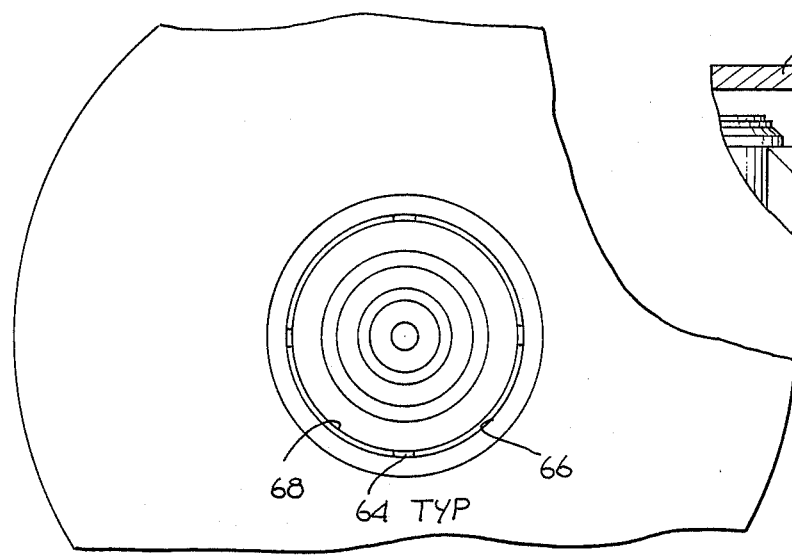
FIG. 7 is a top sectional view showing generally the physical relationship between the present invention and the disks and spindle.

The spacer strips or shims described and shown in FIGS. 5 through 7 and the hub-disk interface shown in FIGS. 1 through 4 can be used together or separately to substantially reduce off-track error. They may also be combined into a single apparatus to provide a cooperative system for controlling and reducing thermally induced radial disk movement.

I claim:

1. In a Winchester hard disk drive assembly comprising at least one disk disposed on a rotatable, cylindrical spindle, the improvement comprising:
   resilient spacer means intermittently disposed between the inner diameter of said at least one disk and the outer diameter of said spindle, for forming a substantially uniform and continuous annular air gap between the inner diameter of said disk and the outer diameter of said spindle, said air gap providing clearance between said disk and said spindle to prevent said inner diameter of said disk from abutting said outer diameter of said spindle due to thermally induced differential expansion of said disk and spindle;
   wherein said spacer means comprises strips of resilient material extending longitudinally with respect to the longitudinal axis of said spindle along at least some portion of the outer wall of said spindle interposed between said spindle and said at least one disk; and means for adhesively securing said spacer means between said spindle and said disk.

2. The improvement as claimed in claim 1 wherein said resilient material has a modulus of elasticity not greater than 65,000 lbs/in$^2$.

3. The improvement as claimed in claim 1 wherein said resilient material comprises a polytetrafluoroethylene material such as TELFON.

4. The improvement as claimed in claim 1 wherein said strips are spaced substantially equidistant from one another about the circumference of said spindle.

5. The improvement as claimed in claim 1 wherein said strips have a nominal thickness of approximately 0.006 inches.

6. In a Winchester disk drive assembly having at least one disk rotatably disposed on a cylindrical spindle the improvement comprising:
   a plurality of spacer strips of fluorocarbon resin material interposed between the inner diameter of said at least one disk and the outer diameter of said cylindrical spindle, said strips forming a substantially uniform and continuous air gap between the inner diameter of said disk and the outer diameter of said spindle, said air gap providing sufficient clearance between said disk and said spindle to prevent said inner diameter of said disk from abutting said outer diameter of said spindle due to thermally induced differential expansion of said disk and said spindle; and
   adhesive means for adhesively securing said spacer strips longitudinally along at least some portion of the outer wall of said spindle.

* * * * *